United States Patent [19]

Rhein et al.

[11] 4,118,427

[45] Oct. 3, 1978

[54] CURABLE LIQUID HYDROCARBON PREPOLYMERS CONTAINING HYDROXYL GROUPS AND PROCESS FOR PRODUCING SAME

[75] Inventors: Robert A. Rhein; John D. Ingham, both of La Canada, Calif.

[73] Assignee: California Institute of Technology, Pasadena, Calif.

[21] Appl. No.: 374,810

[22] Filed: Jun. 28, 1973

Related U.S. Application Data

[63] Continuation-in-part of Ser. No. 332,123, Feb. 13, 1973, abandoned.

[51] Int. Cl.² ............................................. C07C 29/00
[52] U.S. Cl. .................................... 568/852; 568/861
[58] Field of Search ........... 260/635 R, 635 E, 635 A, 260/635 D, 96 D, 94.96 C, 135 R, 135 E, 135 A, 135 D

[56] References Cited

U.S. PATENT DOCUMENTS

| | | | |
|---|---|---|---|
| 2,461,966 | 2/1949 | Davis | 260/94.96 C |
| 2,792,431 | 5/1957 | Niebling et al. | 260/635 E |
| 3,234,197 | 2/1966 | Baum | 260/94.96 C |
| 3,312,744 | 4/1967 | Farr et al. | 260/635 R |
| 3,322,711 | 5/1967 | Bush et al. | 260/94.96 C |
| 3,392,154 | 7/1968 | Baldwin | 260/96 R |
| 3,412,078 | 11/1968 | Hagemeyer et al. | 260/94.9 E |
| 3,429,936 | 2/1969 | Godt | 260/638 R |
| 3,686,248 | 8/1972 | Nelson | 260/63 5 A |

OTHER PUBLICATIONS

Gaylord, "Reduction with Complex Metal Hydrides," (1956), pp. 1017–1022.

*Primary Examiner*—Joseph E. Evans
*Attorney, Agent, or Firm*—Lindenberg, Freilich, Hornbaker, Wasserman, Rosen & Fernandez

[57] ABSTRACT

Production of hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents, preferably diisobutyl aluminum hydride, to form the above-noted hydroxyl-containing liquid prepolymers having a substantially lower molecular weight than the parent polymer.

The resulting curable liquid hydroxyl-containing prepolymers can be poured into a mold and readily cured; e.g.; with reactants such as toluene diisocyanate, to produce highly stable elastomers having a variety of uses such as binders for solid propellants.

18 Claims, No Drawings

CURABLE LIQUID HYDROCARBON PREPOLYMERS CONTAINING HYDROXYL GROUPS AND PROCESS FOR PRODUCING SAME

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a continuation-in-part of our copending U.S. application Ser. No. 332,123, filed Feb. 13, 1973, and now abandoned.

BACKGROUND OF THE INVENTION

1. Field of the invention:

This invention relates to hydroxyl-containing polymers and is particularly concerned with an improved process for producing from saturated or substantially saturated hydrocarbon polymers of generally high molecular weight, relatively low molecular weight curable, hydroxyl-containing liquid saturated hydrocarbon prepolymers, and with production of such low molecular weight curable prepolymers Hydroxy-containing polymers such as hydroxy-terminated liquid prepolymers, can be cured or chain extended to produce highly stable elastomers having many applications. Thus, in our copending application Ser. No. 301,794 filed Oct. 30, 1972, and now U.S. Pat. No. 3,919,172, there is disclosed chain extension of hydroxy-terminated liquid polymeric polyols with a tetrafunctional organic dianhydride, such as pyromellitic dianhydride, for production of stable, elastomeric polymers, e.g., useful as binders for solid propellants.

2. Description of the prior art

In U.S. Pat. No. 3,312,744 there is disclosed a process for producing hydroxyl functional polymers of low molecular weight in the 200–400 range by subjecting long chain nonfunctional olefinic polymers or copolymers, having unsaturation in the primary chain, to ozonization, followed by reduction of the ozonide with lithium aluminum hydride, to yield the above-noted short-chain hydroxy functional polymer.

However, it is noteworthy that the process of the above patent is limited in its application to use of highly unsaturated polymers and copolymers, that is olefinic polymers having a plurality of olefinic linkages in the primary chain, as parent polymer, and produces unsaturated hydroxy functional polymers having a low and relatively narrow molecular weight range.

U.S. Pat. No. 3,392,154 discloses reaction of unsaturated olefin structures of the monoolefin-diolefin copolymer type, with ozone, followed by decomposition of the resulting material to produce saturated hydrocarbon chains containing hydroxyl groups at each end, carboxyl groups at each end, or a mixture of terminal hydroxyl and carboxyl groups. However, here again, the process is limited to use of an unsaturated rubbery copolymer as starting material, and the resulting hydroxyl-containing material is limited to a functionality of only about 2, since only functional end groups are present.

DESCRIPTION OF THE INVENTION

It has now been found unexpectedly in accordance with the invention, that high molecular weight saturated hydrocarbon polymers can be employed directly as starting material and such saturated polymer ozonized and reduced, preferably employing certain reducing agents, such as di-isobutyl aluminum hydride, for efficiently producing liquid, hydroxyl-containing, curable saturated hydrocarbon prepolymers with characteristic backbone structures of the parent polymers, such prepolymers having superior controlled molecular weight characteristics, permitting production of prepolymers having a relatively wide yet selective variation in molecular weight, and having controlled high hydroxyl functionality.

Generally, any hydrocarbon polymer or copolymer which is substantially saturated in its primary chain can be employed as starting polymer to produce the hydroxy-containing liquid prepolymers, according to the invention process. Examples of suitable saturated hydrocarbon polymers and copolymers which can be employed herein include, but are not limited to, polypropylene, particularly amorphous polypropylene, polyisobutylene, poly(1-butene) and ethylene-propylene copolymer rubbers. The saturated hydrocarbon polymer is generally of high molecular weight. The molecular weight of the saturated parent polymeric material can vary widely, however, and can range for example from as low as about 4,000 for polypropylene up to about 1 to 2 million for ethylene-propylene rubbers. Throughout the specification and claims the molecular weight referred to is the number-average molecular weight.

The products produced by the invention process employing such saturated parent polymeric materials are also saturated hydrocarbon prepolymers with characteristic backbone structures of the parent polymers, such as ethylene-propylene copolymers, polypropylene, polyisobutylene and poly(1-butene), containing hydroxy groups, such prepolymers generally being hydroxy-terminated.

Ozonization or ozonolysis of the parent saturated hydrocarbon polymer or copolymer is carried out by passage of a stream of ozone in a carrier gas such as oxygen or air, through an organic solvent solution of the parent polymer. The concentration of ozone in the carrier gas can range from about 1 to about 10% ozone, the ozone-carrier mixture generally employed conveniently containing about 50 to about 100 mg per liter, of ozone. Any organic solvent can be employed which readily dissolves the high molecular weight saturated parent polymer material, but which is inert and does not react readily with ozone. Thus, suitable solvents for this purpose include halogenated hydrocarbons such as carbon tetrachloride or tetrachloroethane (sym-tetrachloroethane), and hydrocarbon solvents such as heptane and methyl cyclohexane.

The flow rate of the ozone-carrier mixture into the solvent solution of the high molecular weight parent polymer or copolymer can be varied and can range from for example about 0.4 to about 2 liters per minute, the volume of ozone thus introduced into the solvent solution during the period of reaction ranging from about 0.5 to about 12 meq (milliequivalents) per gram of the polymer, e.g., about 1 to about 2 meq/gm.

The ozonolysis reaction can be carried out at temperature which can range from about −40° C to about 50° C, preferably from about 0° to about 30° C, and can conveniently be carried out at about ambient temperature (about 25° C). Time of reaction can vary over a wide range, for example the reaction can be completed in as little as about 5 minutes or can be carried out over a period of hours, for example up to as much as 24 hours, depending upon the particular parent polymer being ozonized, and the flow rate of the ozone-containing mixture and the concentration of ozone therein.

The ozonized product thus produced is in the form of a degraded polymer having the characteristic saturated chain structure of the parent polymer but of reduced molecular weight, and containing oxidized groups, e.g., carbonyl groups, as result of the degradation of the high molecular weight saturated chain of the parent polymer in the ozonolysis reaction. After ozonolysis, excess ozone is blown out of the solution and the solution is cooled down to approximately 0° C, e.g., for addition thereto of a reducing agent, where the same solution employed in ozonization is also utilized for reducing the ozonized product.

Where the solvent employed in the ozonolysis reaction is also suitable for carrying out the subsequent reduction reaction, e.g., a hydrocarbon solvent such as heptane, the dissolved ozonized polymeric reaction product need not be recovered, and such solution containing the ozonized product can then be used directly, as noted above, for carrying out the subsequent reduction of the ozonized product, employing a reducing agent as pointed out in detail below. However, where for example the solvent employed in the ozonolysis reaction is one which is not suitable for use in the reduction reaction, for example a chlorinated hydrocarbon such as carbon tetrachloride or tetrachloroethane, such solvent is removed from the resulting ozonized product, e.g., by distillation, and such product is then dissolved in another solvent and the reduction then carried out.

The oxidized end groups of the ozonized polymer can be reduced in any suitable manner so as to substantially completely reduce the ozonized end groups to hydroxyl groups. Thus, such reduction can be accomplished, for example, by catalytic hydrogenation or by employing chemical reducing agents such as lithium aluminum hydride. However, it has been found that di-isobutyl aluminum hydride, a representative material of this type being marketed as DIBAL-H by Texas Alkyls, Inc., sodium bis (2-methoxyethoxy) aluminum hydride having the formula $Na(CH_3OCH_2CH_2O)_2AlH_2$, a representative compound of this type being marketed as Red-Al, by Alfa Inorganics, Inc., and sodium aluminium diethyl dihydride, marketed as OMH-1 by Ethyl Corporation, are particularly effective reducing agents, and are more economical in cost and convenience in the preparation of hydroxy-containing curable liquid prepolymers according to the invention, as compared to use of lithium aluminum hydride. Not only are the di-isobutyl aluminum hydride, the sodium bis (2-methoxyethoxy) aluminum hydride and the sodium aluminum diethyl dihydride reducing agents substantially less expensive than lithium aluminum hydride, but the latter is difficult to dissolve in, and is restricted to use of solvents such as ether or tetrahydrofurane. On the other hand, the other above-noted reducing agents, such as di-isobutyl aluminum hydride, are readily soluble in solvents such as heptane, benzene or toluene.

Suitable solvents for use in reducing the ozonized product are generally solvents which are not chlorinated, usually hydrocarbon solvents, examples of which are aliphatic or aromatic hydrocarbons such as heptane, benzene and xylene. Chlorinated solvents are avoided due to the danger of explosions. Thus, as previously noted, when a chlorinated solvent is employed during ozonolysis, it is preferable first to remove the chlorinated solvent, e.g., by vacuum evaporation, and recover the ozonized product which is usually in the form of a viscous liquid, such product then being dissolved in a suitable nonhalogenated solvent, as described above.

The reducing agent, preferably di-isobutyl aluminum hydride, is incorporated into the solvent solution of the ozonized product in an amount usually in excess, e.g., an excess of about 10% to 30%, of the amount of reducing agent stoichiometrically required to react with the amount of ozonized product. In carrying out the reduction step, the solvent solution of the ozonized product is cooled to low temperature between about $-10$ and about 0° C, e.g., at ice temperature of about 0° C, and maintained at such temperature during addition of the reducing agent. The reducing agent dissolved in a solvent is added dropwise over a period, e.g., of about 20 minutes, to the cooled solution of ozonized product. In the case of the di-isobutyl aluminum hydride reducing agent, usually a 25% heptane solution of such reducing agent is employed, in the case of the above-noted sodium bis (methoxyethoxy) aluminum hydride reducing agent, the latter can be in the form of a 70% solution in benzene, and where sodium aluminum diethyl dihydride is employed, a 25% solution thereof in toluene can be employed. After all of the reducing agent has been added, the reaction mixture is then heated up to approximately ambient temperature, and then additionally heated under reflux conditions, for a period of time which can range from about 15 minutes up to about 2 hours for completion of the reaction.

The refluxed reaction mixture is then cooled; e.g. down to about 0° C, and treated with a suitable material such as methanol or isopropanol, in an amount sufficient to deactivate any excess reducing agent, followed by treatment with dilute sulfuric acid or other suitable acid, to dissolve aluminum-containing material. Any suitable procedure can be employed for recovering and purifying the hydroxy-containing prepolymer product produced on reduction of the ozonized product. Thus for example the organic solvent layer containing the reduced product can be removed by decantation from the aqueous layer, washed with distilled water, and followed by removal of the solvent by vacuum evaporation. The hydroxyl-containing liquid prepolymer recovered is in the form of a viscous liquid.

During the reduction reaction, the ozonized groups on the ozonized polymer, and which may include aldehydic or carbonyl groups, peroxide groups and the like, are reduced substantially completely to hydroxyl groups. Complete conversion to hydroxyl groups can be shown by infrared spectra. The resulting hydroxy-containing saturated hydrocarbon prepolymer is believed to be essentially a hydroxy-terminated prepolymer, that is a prepolymer containing reactive hydroxyl end groups, but some random or pendant reactive hydroxyl groups often can be present along the main chain, thereby increasing the hydroxyl functionality of the prepolymer for reaction or chain extension with suitable curing agents. As previously noted, such hydroxy-containing saturated hydrocarbon prepolymers have the characteristic backbone structures of the parent polymers. Such prepolymers have a molecular weight substantially less than the molecular weight of the saturated parent hydrocarbon polymer, and such molecular weight can range from as low as about 500, e.g., in the case of the prepolymer produced from amorphous polypropylene, up to about one quarter of the molecular weight of the parent starting material. It has been found usually that the molecular weight of the prepolymer ranges from about 500 to about 5,000, and often from about 1,000 to about 5,000. The functionality of the hydroxyl-terminated prepolymer can range from about 1.2 to about 3.5, usually from about 1.9 to 3.0. The high limits of hydroxyl functionality in the above ranges is due to pendant hydroxy groups which may be present in the prepolymer. Particularly in the case of prepolymers of polypropylene and of ethylene-propylene copolymer, the functionality thereof can be in the range of about 2.5 to 3.0. This high functionality possessed by applicants' prepolymers is in contrast to the lower functionality of the products of above U.S. Pat. No. 3,392,154, which contain only hydroxy end groups.

It has been found as an additional feature of the invention process, that the molecular weight of the hydroxy-containing prepolymer product produced can be controlled by the amount of ozone employed during the ozonization step, the larger the amount of ozone, the lower the intrinsic viscosity and hence the molecular weight, and indicating increased main chain degradation during ozonolysis. The hydroxyl-containing curable liquid prepolymers can be produced in high yield greater than 80%, e.g., from about 85 up to about 99% or more, based on the parent polymer, in accordance with the invention process.

The hydroxy-containing curable liquid prepolymers produced according to the invention process can be poured into a mold and readily cured to produce highly stable elastomers having a wide variety of uses, such as binders for solid propellants, sealants, adhesives, and the like. Thus, such prepolymers can be cured by reaction with toluene-2,4-diisocyanate or by reaction with polymethylene polyphenyl isocyanate or with organic dianhydrides, e.g., pyromellitic dianhydride, as disclosed in our above copending application Ser. No. 301,794, employing suitable catalysts such as ferric acetyl acetonate, in these curing reactions.

The following are examples of practice of the invention process

EXAMPLE 1

Saturated polyisobutylene, Mn 82,000, 16.3 grams, was dissolved in $CCl_4$ to form a 2.06% solution. Ozone was produced by a Welsbach T-816 Ozonator, using oxygen input, and forming an ozone-oxygen mixture, the concentration of ozone therein being 55 mg/liter. The ozone-oxygen gas mixture was passed through the $CCl_4$ solution of the polymer at a flow rate of about 0.4 liters per minute, for a period of about 71 minutes, the polymer solution being maintained at about ambient temperature. The treatment with ozone was carried out to the extent of 6 meq per gram of polymer. With admitted ozone, the intrinsic viscosity and hence molecular weight decreased.

The $CCl_4$ solvent of the ozonized reaction mixture was removed by distillation, and the ozonized polymer was redissolved in heptane, and the resulting solution cooled to ice temperature at about 0° C. A 25% heptane solution of di-isobutyl aluminum hydride (DIBAL-H) was added to the heptane solution of the ozonized polymer over a period of about 20 minutes, employing an excess of about 30% of reducing agent over the amount required theoretically to react with all of the ozonized product, and after all of this reducing agent was added, the reaction mixture was heated to ambient temperature and then additionally heated under reflux for 2 hours.

The refluxed reaction mixture was then cooled down to about 0° C, and methanol was added in an amount sufficient to deactivate excess reducing agent. 10% sulfuric acid was then added, and the organic heptane-polymer layer was removed by decantation from the aqueous layer, the organic layer washed with distilled water and dried, and the heptane was removed by vacuum evaporation, recovering 16.3 grams of a viscous liquid hydroxy-terminated saturated polyisobutylene prepolymer having an intrinsic viscosity of 0.10 (benzene), a molecular weight of about 1,812, the prepolymer yield being about 100%.

EXAMPLE 2

The liquid hydroxy-terminated polyisobutylene prepolymer prepared in Example 1 was poured into a mold and cured or chain extended with toluene-2,4-diisocyanate (mol ratio NCO/OH equals 1.05) and ferric acetyl acetonate (FeAA) as catalyst (mol ratio FeAA/OH = 0.002) at 71° C for 66 hours. A highly stable cured elastomeric polymer was formed having utility as a binder for solid propellants.

EXAMPLE 3

The procedure of Example 1 was followed except employing as reducing agent sodium bis(2-methoxy ethoxy) aluminum hydride, as a 70% solution thereof in benzene, in the same excess amount.

A liquid hydroxyl-terminated curable polyisobutylene prepolymer is produced having properties similar to those of the polyisobutylene prepolymer prepared in Example 1, and obtained in substantially the same high yield.

EXAMPLE 4

The procedure of Example 1 was followed, except employing heptane as solvent for the saturated polyisobutylene starting material, in the form of a 10% solution of the polymer, in the ozonolysis reaction. Also, the ozonized polymer produced was not separated from the heptane solution, but such heptane solution was employed directly in the reduction reaction, the 25% heptane solution of the di-isobutyl aluminum hydride reducing agent being added to the heptane solution of the ozonized polymer.

A liquid curable hydroxyl-terminated polyisobutylene prepolymer was recovered, having substantially the same properties as the prepolymer produced in Example 1, and obtained in comparable yield.

EXAMPLE 5

The procedure of Example 4 was followed employing in place of the saturated polyisobutylene parent polymer, the respective parent polymers amorphous polypropylene, poly(1-butene) and ethylene-propylene rubber, using amounts of such respective saturated polymers equivalent to the amount of polyisobutylene employed in Example 4.

Liquid curable hydroxyl-terminated saturated polypropylene, poly(1-butene) and ethylene-propylene prepolymers were respectively obtained. The molecular weights of these respective prepolymers were about 1,000 for the prepolymer produced from amorphous polypropylene, about 2,000 for the prepolymer from poly(1-butene) and about 2,000 for the prepolymer from ethylene-propylene rubber. These polymers had hydroxyl functionality ranging from about 1.5 to 3.0.

The yields of these respective prepolymers were in the range of about 80 to about 90%.

EXAMPLE 6

The respective liquid prepolymers of polypropylene, poly(1-butene) and ethylene-propylene copolymers were cured in the manner described in Example 2, in each case producing highly stable cured polymers.

EXAMPLE 7

Ethylene-propylene copolymer (EPR) and amorphous polypropylene were respectively ozonized in $CCl_4$ and reduced in excess DIBAL-H reducing agent generally according to the procedure of Example 1, the resulting liquid prepolymer of polypropylene having a molecular weight of about 1,050 and a hydroxyl functionality of about 2.64, and the resulting liquid hydroxyl-containing prepolymer of EPR having a molecular weight of about 550 and a hydroxyl functionality of 2.34.

EXAMPLE 8

The procedure of Example 1 was repeated but employing a 25% toluene solution of sodium aluminum diethyl dihydride (OHM-1) as reducing agent instead of DIBAL-H.

Results similar to Example 1 were obtained.

EXAMPLE 9

The procedure of Example 5 was followed, except employing a 25% toluene solution of sodium aluminum diethyl dihydride as reducing agent for reduction of the ozonized polymers, instead of DIBAL-H.

Results similar to those of Example 5 were obtained.

From the foregoing, it is seen that the invention provides improved procedure for producing saturated hydroxyl-containing liquid prepolymers, from substantially saturated or saturated hydrocarbon polymers, by ozonolysis, followed by reduction of the ozonized polymer, preferably employing certain reducing agents, and particularly di-isobutyl aluminum hydride, resulting in hydroxyl-containing, prepolymers having high hydroxyl functionality, which can be readily cured to produce highly stable and useful elastomers. A particularly important feature and concept of the invention is that completely saturated hydrocarbons such as polypropylene, polyisobutylene, poly(1-butene) and ethylene-propylene copolymer, can be directly ozonized and the ozonized product reduced, to produce curable hydroxyl-containing liquid saturated hydrocarbon prepolymers, according to the invention process.

While we have described particular embodiments of the invention for purposes of illustration, it will be understood that various changes and modifications can be made therein within the spirit of the invention, and the invention accordingly is not to be taken as limited except by the scope of the appended claims.

We claim:

1. A process for producing a low molecular weight curable hydroxyl-containing liquid saturated hydrocarbon prepolymer from a high molecular weight saturated hydrocarbon parent polymer, comprising subjecting said saturated parent hydrocarbon polymer to ozonolysis by passing ozone into a solution of said parent polymer in an organic solvent which readily dissolves said saturated parent hydrocarbon polymer but which is inert and does not react readily with ozone, and which is selected from the group consisting of halogenated hydrocarbons and hydrocarbons, and degrading said polymer to produce a degraded ozonized polymer of reduced molecular weight, reducing said ozonized polymer in a hydrocarbon solvent for said ozonized polymer, and converting said ozonized polymer to said hydroxyl-containing liquid prepolymer 2. A process as defined in claim 1, wherein said parent hydrocarbon polymer is a saturated polymer selected from the group consisting of polypropylene, polyisobutylene, poly(1-butene) and ethylene-propylene copolymer.

3. A process as defined in claim 1, said reducing being carried out by means of a chemical reducing agent 4. A process as defined in claim 1, said reducing said ozonized polymer being carried out by adding a reducing agent selected from the group consisting of di-isobutyl aluminum hydride, sodium bis(2-methoxy ethoxy) aluminum hydride and sodium aluminum diethyl dihydride, to an organic solvent solution of said ozonized polymer, employing a non-chlorinated hydrocarbon solvent.

5. A process as defined in claim 2, said reducing said ozonized polymer being carried out by adding a reducing agent selected from the group consisting of di-isobutyl aluminum hydride, sodium bis(2-methoxy ethoxy) aluminum hydride and sodium aluminum diethyl dihydride, to an organic solvent solution of said ozonized polymer, employing a non-chlorinated hydrocarbon solvent.

6. A process as defined in claim 4, wherein said reducing agent is employed in excess of the amount required to stoichiometrically react with said ozonized polymer, and including deactivating the excess reducing agent, said hydroxyl-containing liquid prepolymer having a molecular weight ranging from about 500 to about one quarter of the molecular weight of the parent hydrocarbon polymer, and a hydroxyl functionality ranging from about 1.2 to about 3.5.

7. A process as defined in claim 5, wherein said reducing agent is employed in excess of the amount required to stoichiometrically react with said ozonized polymer, and including deactivating the excess reducing agent, said hydroxyl-containing liquid prepolymer having a molecular weight ranging from about 500 to about one quarter of the molecular weight of the parent hydrocarbon polymer, and a hydroxyl functionality ranging from about 1.2 to about 3.5.

8. A process as defined in claim 4, wherein said first mentioned solvent is a halogenated hydrocarbon.

9. A process as defined in claim 4, wherein said solvent in said ozonolysis step and said solvent in said reducing step is the same hydrocarbon solvent.

10. A process as defined in claim 6, including passing a mixture of ozone in a carrier gas selected from the group consisting of oxygen and air, into a solution of said parent hydrocarbon polymer in an organic solvent selected from the group consisting of carbon tetrachloride, tetrachloroethane, heptane and methyl cyclohexane, at temperature ranging from about $-40°$ C to about 50° C, to form said degraded ozonized polymer, said last mentioned polymer containing carbonyl groups, and including adding said reducing agent in the form of a solvent solution thereof, to said solution of said ozonized polymer in a solvent selected from the group consisting of heptane, benzene and xylene, at temperature ranging from about $-10°$ to about 0° C, and thereafter increasing said temperature to reflux temperature and maintaining said reaction under reflux for a period to form said prepolymer, and employing methanol for deactivating said excess reducing agent, said prepolymer having a molecular weight ranging from about 500 to about 5,000.

11. A process as defined in claim 10, wherein said reducing agent is di-isobutyl aluminum hydride.

12. A process as defined in claim 10, wherein ozonolysis of said parent hydrocarbon polymer with ozone, and reduction of said ozonized polymer with said reducing agent, are both carried out in heptane solvent.

13. A process as defined in claim 10, wherein the ozonolysis of said parent hydrocarbon polymer with ozone is carried out in a chlorinated solvent for said parent hydrocarbon polymer.

14. A process as defined in claim 10, the ozonolysis reaction of said parent hydrocarbon polymer with ozone being carried out in said organic solvent for said polymer, at about ambient temperature, employing a concentration of ozone in said carrier gas ranging from about 1 to about 10% ozone, and a flow rate of about 0.4 to about 2 liters of said ozone-carrier mixture per minute, said reducing agent being employed in an excess of about 10% to about 30% of the amount of reducing agent stoichiometrically required to react with said ozonized polymer, said refluxing during said reducing reaction being carried out for a period of about 15 minutes to about 2 hours, and including adding sulfuric acid to said reaction mixture after deactivation of the reducing agent with said methanol, removing the resulting solvent solution of prepolymer, and recovering said prepolymer from said solvent in a yield in excess of 80% based on parent polymer.

15. A process as defined in claim 14, both said ozonolysis reaction with ozone, and said reducing action employing said reducing agent, taking place in a heptane solution.

16. A process as defined in claim 14, wherein said ozonolysis reaction is carried out in carbon tetrachloride as solvent for said parent hydrocarbon polymer and said reducing reaction is carried out in heptane as solvent for said ozonized polymer.

17. A process as defined in claim 10, wherein said parent hydrocarbon polymer is a saturated polymer selected from the group consisting of amorphous polypropylene, polyisobutylene, poly(1-butene) and ethylene-propylene copolymer 18. A process as defined in claim 14, wherein said parent hydrocarbon polymer is a saturated polymer selected from the group consisting of amorphous polypropylene, polyisobutylene, poly(1-butene) and ethylene-propylene copolymer.

* * * * *